United States Patent Office 3,273,977
Patented Sept. 20, 1966

3,273,977
BEARING OF SINTERED METAL CONTAINING INTERSTITIAL SOLID LUBRICANT
William J. Davis, Wyomissing, Pa., assignor, by mesne assignments, to The Polymer Corporation, a corporation of Pennsylvania
No Drawing. Continuation of application Ser. No. 187,183, Apr. 13, 1962. This application June 1, 1964, Ser. No. 371,734
3 Claims. (Cl. 29—182.5)

This invention relates to an improved self-lubricated metal bearing and a method for its manufacture, and is a continuation of co-pending application Serial No. 187,183, filed April 13, 1962, and now abandoned. More particularly, this invention relates to a sintered metal bearing that holds within its interstices a polymeric fluorocarbon lubricant.

The metals with which this invention is concerned are particularly those that can be sintered at relatively low temperatures (e.g., below about 1000° F.) and are also electrically and thermally conductive. Copper and silver are examples of two such metals of which silver is especially useful.

The polymeric lubricant with which this invention is concerned is a form of polytetrafluoroethylene (PTFE) generally known as "waxy" PTFE. The preparation of waxy PTFE is set forth below and can be identified as a thermally degraded form of PTFE. It is distinguishable from PTFE by its rather sharp melting point but otherwise is somewhat similar to PTFE, particularly with respect to its low coefficient of friction.

It is an object of this invention to prepare a self-lubricated bearing.

A further object is to prepare a self-lubricated bearing that is adaptable for high temperature operation.

Another object of this invention is to prepare a bearing that has a low coefficient of friction and high coefficient of electrical and thermal conductivity.

Briefly, the objects of this invention are achieved by thermally degrading PTFE to its waxy state, intimately mixing the thermally degraded PTFE with a finely divided metal, compacting the mixture into a green (unsintered) article, and heating the article to a temperature sufficient to sinter the metal content of the article. By these means a rigid metal bearing is prepared that has a low coefficient of friction, high coefficients of thermal and electrical conductivity, is self-lubricating, and is adaptable for high temperature operation.

PREPARATION OF THERMALLY DEGRADED PTFE

Thermally degraded PTFE is prepared by exposing commercially available PTFE resin (such as the product "Teflon" sold by Du Pont) to elevated temperatures above the transition temperature for PTFE for a period of time sufficient to degrade the PTFE from a gel state into a mobile fluid. For example, this conveniently can be done by heating PTFE in the range of from about 1000° to 1500° F. for a period of time generally less than one-half hour.

It is advantageous to agitate the PTFE mildly while it is undergoing thermal degradation. It is also important that such operation be conducted in a thoroughly ventilated oven as certain decomposition products are evolved that contain noxious fluorine-containing compounds.

After the PTFE has been degraded to a mobile liquid, it may be cooled to room temperature. This material may be rather dirty gray in color, presumably due to the presence of free carbonaceous material. Also present in this material are certain low boiling polymeric materials which preferably should be volatilized by evaporation. Accordingly, in the preferred method of this invention, the thermally degraded PTFE is ground to a convenient particle size and placed in an oven at elevated temperatures (e.g., about 600°–800° F.) to oxidize any free carbonaceous material and to volatilize any low boiling materials contained therein. For convenience, this is referred to as "heat stabilization." The completion of the heat stabilization operation may be observed visibly as the thermally degraded PTFE will change from a dirty gray color to an almost pure white. Alternatively, rather than cooling the thermally degraded PTFE to room temperature, grinding and reheating it, the degraded material may be cooled from degradation temperatures to about 600°–800° F. and detained at these temperatures for a sufficient length of time to heat-stabilize the material.

The waxy PTFE so prepared has a comparatively sharp melting point between 590° and 600° F. Below this temperature the waxy PTFE looks and feels like a hard wax and above this temperature it changes abruptly to a moderately low viscosity fluid.

Due to the low viscosity of the waxy PTFE, it is capable of flowing through the interstices of a metal article at temperatures above its melting point. With respect to the below described sintering operation, this low viscosity enables sintering without build-up of pressures within the green article and thus the internal structure of the green article is not destroyed (as would be the case if PTFE were used) even though sintering temperatures are in considerable excess of the transition temperature of the waxy PTFE. Also, due to the same low viscosity, the waxy PTFE may exude from the metal article under high temperature and loading conditions. As such, the waxy PTFE serves as a fugitive lubricant, being released to the bearing surfaces as required by the imposed pressures and the temperatures of operation.

Example

Waxy PTFE was prepared by charging approximately 200 grams of PTFE into an evaporating dish. This was placed in an electric furnace and raised to a temperature of about 1100° F. for about 20 minutes. During this time the material was occasionally agitated and fumes were continually vented from the furnace. At the end of the 20 minutes, the gel-like structure of the PTFE had disappeared and a mobile liquid was present. The evaporating dish containing the degraded PTFE was removed from the oven and allowed to cool to room temperature. This material was then chopped in a Waring blender so that it would pass an 8 mesh screen and then was spread out in a thin layer and heated to 720° F. for about 3 hours. During this heat-stabilization the waxy PTFE changed from a dirty gray color to a pure white.

After heat stabilization, the waxy PTFE was cooled to room temperature and chopped in a Waring blender and then milled to reduce it in size until it passed through an 80 mesh screen. To this was added finely divided silver (−325 mesh) and finely divided cadmium oxide (−325 mesh), the latter being a known additive to harden silver. The proportions of ingredients added were as follows:

| Material | Weight, grams | Percent by Volume |
|---|---|---|
| Silver | 10.59 | 79.5 |
| Waxy PTFE | 2.2 | 9.6 |
| Cadmium oxide | 8.5 | 10.9 |

This mixture was then charged into a Abbey ball mill jar and milled for approximately 3 hours using a ½ lb. charge of pebbles. After the 3 hour period, the material was sieved through a 325 mesh screen. Slugs were pressed from this material approximately ¼ inch in diameter and ¼ inch in length. The compaction was done at pressures of about 25 tons per square inch. The green (unsintered) slugs so prepared were then sintered for 2 hours at 720° F.

The samples so prepared were found to have excellent characteristics as bearings, the coefficient of friction was low, and the thermal and electrical conductivity was high.

In addition to bearing structures, the articles prepared in accordance with this invention also may be useful as electrical contactors, such as brushes for motors and generators, electrical control devices such as circuit breakers, voltage regulators and motor controllers. In addition to their low coefficient of friction and good electrical properties, it has been found that metal articles coated with PTFE are less subject to arcing erosion in electrical contacting devices, apparently due to a protective shield of PTFE. Also, bearings made in accordance with this invention are particularly suitable for high altitude and space application. It has been found that many lubricants do not perform efficiently unless a certain amount of moisture is held on the surface. Therefore, when above the earth's atmosphere, conventional solid lubricants, such as graphite, may not provide good lubricity whereas waxy PTFE is not subject to this disability.

It should be mentioned that the sintering temperatures referred to herein are considerably lower than those commonly used for sintering metals and the ultimate strength that can be obtained by heating powdered metals to high sintering temperatures is not achieved. Nonetheless, the sintering temperatures are sufficiently high to yield a usefully strong article and to insure that the metal is sintered to exist in a continuous phase.

I claim:
1. An article of manufacture comprised of sintered metal and a solid lubricant held within the interstices of such sintered metal, said metal being selected from the class consisting of copper and silver and said solid lubricant being thermally degraded polytetrafluoroethylene.
2. An article according to claim 1 in which said metal is present in an amount between 75% and 95% by volume and in which said thermally degraded polytetrafluoroethylene is present in about 5% to 25% by volume.
3. An article according to claim 1 in which cadmium oxide is present in an amount from about 5% to 10% by volume.

References Cited by the Examiner

UNITED STATES PATENTS

| | | | |
|---|---|---|---|
| 1,051,814 | 1/1913 | Lowendahl | 29—182.5 X |
| 2,691,814 | 10/954 | Tait | 29—182.5 |
| 2,731,360 | 1/1956 | Love. | |
| 2,788,324 | 4/1957 | Mitchell | 75—210 X |

OTHER REFERENCES

Goetzel: "Treatise of Powder Metallurgy," vol. 1, Interscience Publishers, Inc., New York, 1950, p. 220.

L. DEWAYNE RUTLEDGE, *Primary Examiner.*

LEON D. ROSDOL, BENJAMIN R. PADGETT,
*Examiners.*

R. L. GRUDZIECKI, *Assistant Examiner.*